(12) United States Patent
Shin et al.

(10) Patent No.: US 9,522,701 B2
(45) Date of Patent: Dec. 20, 2016

(54) STEERING RISK DECISION SYSTEM AND METHOD FOR DRIVING NARROW ROADS

(71) Applicant: Hyundai Motor Company, Seoul (KR)

(72) Inventors: Ki Cheol Shin, Gyeonggi-do (KR); Chang Jae Lee, Gyeonggi-do (KR); Ee Suk Jung, Seoul (KR)

(73) Assignee: Hyundai Motor Company, Seoul (KR)

( * ) Notice: Subject to any disclaimer, the term of this patent is extended or adjusted under 35 U.S.C. 154(b) by 88 days.

(21) Appl. No.: 14/278,518

(22) Filed: May 15, 2014

(65) Prior Publication Data

US 2015/0142299 A1    May 21, 2015

(30) Foreign Application Priority Data

Nov. 15, 2013    (KR) .................. 10-2013-0138974

(51) Int. Cl.
*B62D 15/02* (2006.01)
*G06K 9/00* (2006.01)
*G06T 11/20* (2006.01)

(52) U.S. Cl.
CPC ....... *B62D 15/0295* (2013.01); *G06K 9/00805* (2013.01); *G06T 11/20* (2013.01)

(58) Field of Classification Search
CPC ........ G08G 1/166; G08G 1/167; G08G 1/165; G08G 1/16; G08G 1/163; G08G 1/164; G08G 1/161; G08G 1/168; G08G 1/202; G08G 5/0008; G01S 13/862; G01S 13/865; G01S 13/9303; G01S 15/93; G01S 17/42; G01S 17/93; G01S 19/11; G01S 19/27; G01S 19/41; G01S 19/42

See application file for complete search history.

(56) References Cited

U.S. PATENT DOCUMENTS

| | | | | |
|---|---|---|---|---|
| 7,069,146 B2 * | 6/2006 | Yamamura | ............. | G08G 1/167 340/436 |
| 8,184,857 B2 * | 5/2012 | Akita | .................... | G06T 7/2066 348/143 |
| 8,244,458 B1 * | 8/2012 | Blackburn | ............. | G08G 1/163 340/435 |

(Continued)

FOREIGN PATENT DOCUMENTS

| JP | 2007-323333 A | 12/2007 |
|---|---|---|
| KR | 10-2011-0131899 | 12/2011 |

(Continued)

*Primary Examiner* — Truc M Do
(74) *Attorney, Agent, or Firm* — Mintz Levin Cohn Ferris Glovsky and Popeo, P.C.; Peter F. Corless

(57) ABSTRACT

The present invention provides a steering risk decision system and method that determine and provide a steering risk of a vehicle to a driver. The system includes an obstacle sensor that senses an obstacle to generate first sensor data and a driving state sensor senses a driving state of a vehicle to generate second sensor data. In addition, a processor extracts feature points from first sensor data to indicate the obstacle in point and line shapes and predicts a driving region of the vehicle using second sensor data. Further, the processor calculates a relationship between the vehicle and the obstacle using information for the obstacle indicated in the point and line shapes and information for the driving region to determine a steering risk of the vehicle based on the calculated result.

11 Claims, 9 Drawing Sheets

(56) References Cited

U.S. PATENT DOCUMENTS

| | | | |
|---|---|---|---|
| 8,924,140 B2* | 12/2014 | Sakamoto | G08G 1/166 340/435 |
| 2006/0212222 A1* | 9/2006 | Miyoshi | B60K 31/0008 701/301 |
| 2007/0106475 A1* | 5/2007 | Kondoh | B60K 26/021 701/301 |
| 2008/0288140 A1* | 11/2008 | Matsuno | B60T 8/17551 701/41 |
| 2009/0037052 A1* | 2/2009 | Ogasawara | G08G 1/165 701/41 |
| 2010/0106356 A1* | 4/2010 | Trepagnier | G01S 17/023 701/25 |
| 2011/0103650 A1* | 5/2011 | Cheng | B60R 1/00 382/104 |
| 2011/0128138 A1* | 6/2011 | Yamamoto | B60W 30/0956 340/436 |
| 2011/0187515 A1* | 8/2011 | Saito | B60T 7/22 340/425.5 |
| 2011/0301845 A1* | 12/2011 | Harada | B60R 21/0134 701/301 |
| 2012/0035846 A1* | 2/2012 | Sakamoto | B60T 8/17558 701/301 |
| 2012/0078498 A1* | 3/2012 | Iwasaki | B60W 10/06 701/300 |
| 2012/0081542 A1* | 4/2012 | Suk | G06K 9/00805 348/139 |
| 2012/0265416 A1* | 10/2012 | Lu | B60R 1/00 701/70 |
| 2012/0323479 A1* | 12/2012 | Nagata | B60Q 9/008 701/301 |
| 2013/0010112 A1* | 1/2013 | Goto | G06K 9/00805 348/148 |
| 2013/0194127 A1* | 8/2013 | Ishihara | G01S 13/18 342/70 |
| 2013/0218448 A1* | 8/2013 | Suzuki | G01S 13/931 701/300 |
| 2014/0037138 A1* | 2/2014 | Sato | G06K 9/00805 382/103 |

FOREIGN PATENT DOCUMENTS

| | | |
|---|---|---|
| KR | 10-2012-0086576 A | 8/2012 |
| KR | 10-2012-0086719 | 8/2012 |

* cited by examiner

# STEERING RISK DECISION SYSTEM AND METHOD FOR DRIVING NARROW ROADS

CROSS REFERENCE TO RELATED APPLICATION

This application is based on and claims priority from Korean Patent Application No. 10-2013-0138974, filed on Nov. 15, 2013 in the Korean Intellectual Property Office, the disclosure of which is incorporated herein in its entirety by reference.

BACKGROUND OF THE INVENTION

Field of the Invention

The present invention relates to a system and a method of determining and guiding a steering risk of a vehicle, and more particularly, to a method that allows a driver to safely pass through a narrow road by predicting a driving region based on a steering manipulation by the driver, determining a collision risk of the vehicle based on the predicted driving region, and then information the driver of the risk.

Description of the Prior Art

When driving on through alley or a general road having a substantially narrow width, a driver may have to narrowly pass through between a parked vehicle and an outer wall of a building or other parked vehicles. Particularly, when driving on such a narrow road, the driver needs to drive while not colliding with an obstacle by adjusting a steering angle via a steering manipulation. To predict whether it is possible to drive while not colliding with the obstacle through the steering manipulation, the driver needs to predict whether a left and right collision occurs while moving the vehicle inch by inch. In other words, the vehicle has to be driven substantially slowly while the steering manipulation is adjusted to avoid colliding with any obstacles.

SUMMARY

Accordingly, the present invention provides a system in which a driver may more simply and accurately predict whether a left and right collision may occur by recognizing peripheral obstacles, determining a left and right collision risk using steering information based on a steering manipulation, and informing the driver of the left and right collision risk.

In one aspect of the present invention, a steering risk decision system may include: an obstacle sensor configured to sense an obstacle to generate first sensor data; a feature point extractor executed by a processor and configured to extract feature points from first sensor data to indicate the obstacle in point and line shapes; a driving state sensor configured to sense a driving state of a vehicle to generate second sensor data; a driving region predictor configured to predict a driving region of the vehicle using second sensor data; and a risk determinator executed by the processor and configured to calculate a relationship between the vehicle and the obstacle using information for the obstacle indicated in the point and line shapes and information for the driving region and determine a steering risk of the vehicle based on the calculated result.

In another aspect of the present invention, a steering risk decision method of a vehicle may include: extracting, by a processor, feature points of an obstacle to indicate the obstacle in point and line shapes; sensing, by a sensor, a driving state of the vehicle to predict a driving region of the vehicle; and calculating, by the processor, a relationship between the vehicle and the obstacle using information for the obstacle indicated in the point and line shapes and information for the driving region and determining a steering risk of the vehicle based on the calculated result.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION

Figure 1:
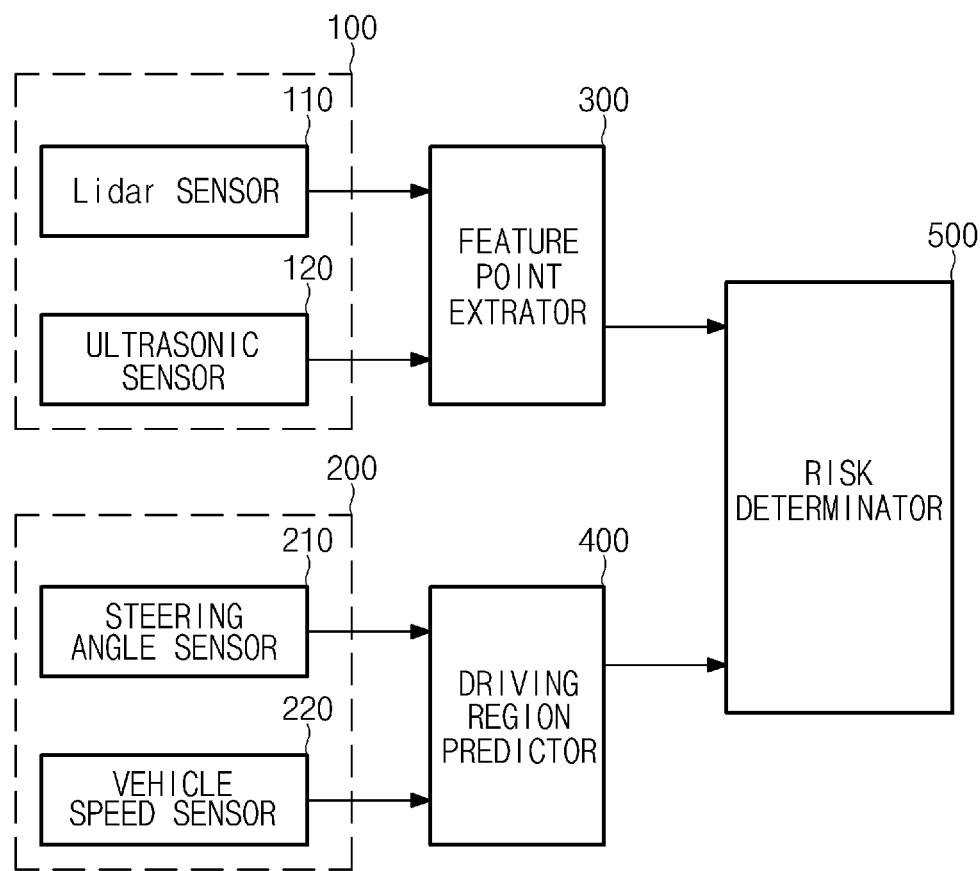
FIG. 1 is an exemplary view showing a configuration of a steering risk decision system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings. The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present invention are merely exemplary embodiments but do not represent all of the technical spirit of the present invention. Thus, the present invention should be construed as including all the changes, equivalents, and substitutions included in the spirit and scope of the present invention at the time of filing this application.

FIG. 1 is an exemplary view showing a configuration of a steering risk decision system according to an exemplary embodiment of the present invention. A steering risk decision system according to an exemplary embodiment of the present invention may include an obstacle sensor 100, a driving state sensor 200, a feature point extractor 300, a driving region predictor 400, and a risk determinator 500. The feature point extractor 300, the driving region predictor 400, and the risk determinator 500 are executed by a processor.

The obstacle sensor 100 may be configured to sense obstacles positioned in front and at a side of a vehicle and may be configured to provide the sensed data to the feature point extractor 300. The obstacle sensor 100 may include a light detection and ranging (Lidar) sensor 110 installed in a front of the vehicle to sense the obstacles positioned at a front of the vehicle and an ultrasonic sensor 120 installed at the side of the vehicle to sense obstacles at the side of the vehicle. In addition, the driving state sensor 200 may be configured to measure a steering angle of the vehicle and a driving speed of the vehicle and provide the measured steering angle and driving speed to the driving region predictor 400. The driving state sensor 200 may include a steering angle sensor 210 mounted at a lower end portion of a steering wheel to measure a steering angle based on a steering manipulation by the driver and vehicle speed sensors 220 each installed at the wheels of the vehicle to measure a longitudinal speed of the vehicle based on a speed of each wheel.

Figure 2:
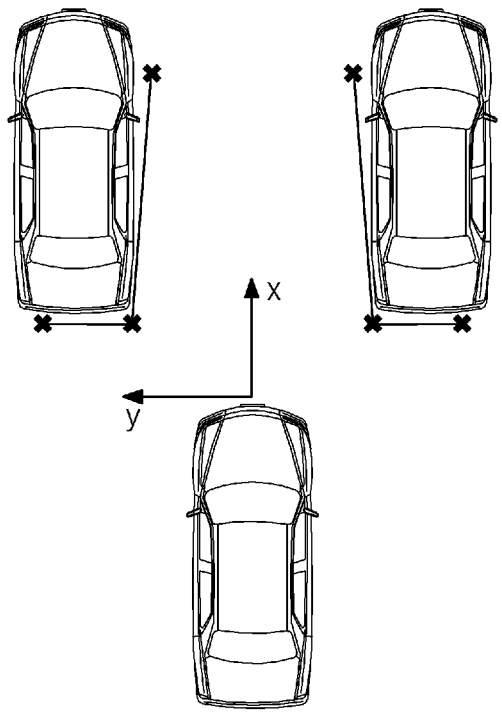
FIG. 2 is an exemplary view showing a figure in which a feature point extractor indicates obstacles in front as points and lines according to an exemplary embodiment of the present invention.

The feature point extractor 300 may be configured to arrange the obstacles in point and line shapes on a two-dimensional plane using sensor data provided from the obstacle sensor 100 and provide the arrangement information for the obstacle to the risk determinator 500. For example, the feature point extractor 300 may be configured to cluster sensor data provided from the obstacle sensor 100 and detect feature points from the classified cluster to cluster the feature points in the point and line shapes as shown in FIG. 2. In addition, the feature point extractor 300 may be configured to arrange data extracted in the point and line shapes on the two-dimensional plane. In particular, a coordinate system may use a coordinate system fixed to the vehicle. Further, the driving region predictor 400 may be configured to predict a driving region of the vehicle using sensor data (e.g., a steering angle and a driving speed) provided from the driving state sensor 200 and provide information for the predicted driving region to the risk determinator 500. For example, the driving region predictor 400 may be configured to predict the driving region by utilizing a behavior model of the vehicle. Since the narrow road driving generally occurs on an alley (or other similar areas), a general road having a substantially narrow width, or the like and the driver may stop or drive at a relatively low speed on the narrow road, the driving region may be predicted using a vehicle kinematics model that predicts a behavior of a predetermined low speed section.

Figure 3:
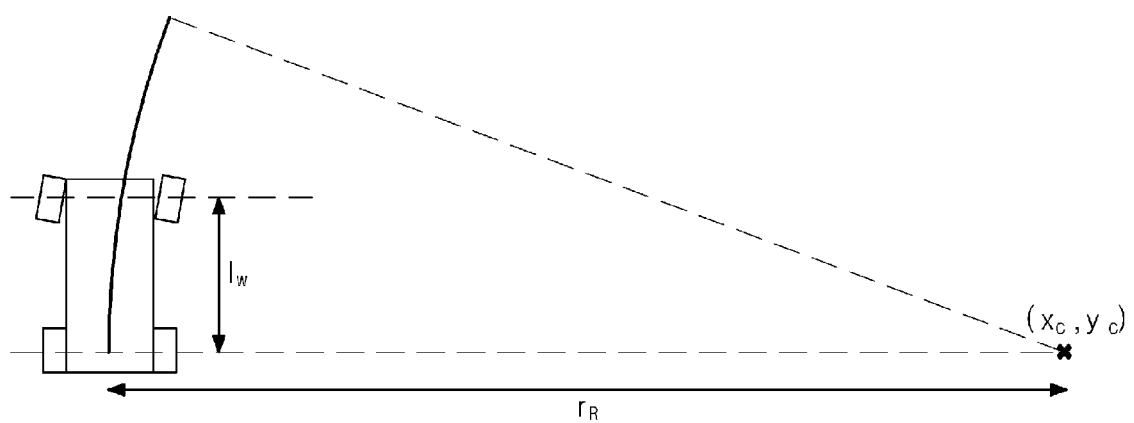
FIG. 3 is an exemplary view showing a figure predicting a driving path by using a vehicle behavior model (kinematics model) according to an exemplary embodiment of the present invention.

FIG. 3 is an exemplary view showing a figure predicting a driving path using a vehicle behavior model (vehicle kinematics model), where when the front wheels of the vehicle are manipulated by an angle of $\delta$ and a length between a front wheel and a rear wheel of the vehicle is $l_w$, the processor may be configured to predict that the vehicle is being driven in a form along a circular arc in which a radius of a rear wheel shaft is $r_R = l_w / \tan(\delta)$.

The risk determinator 500 may be configured to determine a steering risk of the vehicle and provide a risk situation to the driver by calculating a relationship between the driving region and the obstacle using obstacle arrangement information provided from the feature point extractor 300 and information for the driving region provided from the driving region predictor 400. For example, the risk determinator 500 may be configured to divide front and side regions of the vehicle into a risk region, a warning region, and a safety region based on the driving region provided from the driving region predictor 400 and compare the divided regions and obstacle arrangement information to determine a risk. In addition, the risk determinator may be configured to divide (e.g., categorize) the risk region and the warning region into a left region and a right region based on the center of a rear wheel shaft of the vehicle and then compare the divided regions and obstacle arrangement information to each determine the steering risk for the left and right of the vehicle.

FIG. 4 an exemplary view showing a method of setting a risk region and a warning region in a peripheral region of a vehicle. When the vehicle is being driven while turning at a predetermined fixed steering angle, a broader width may be required unlike a substantially straight drive.

Figure 4A:
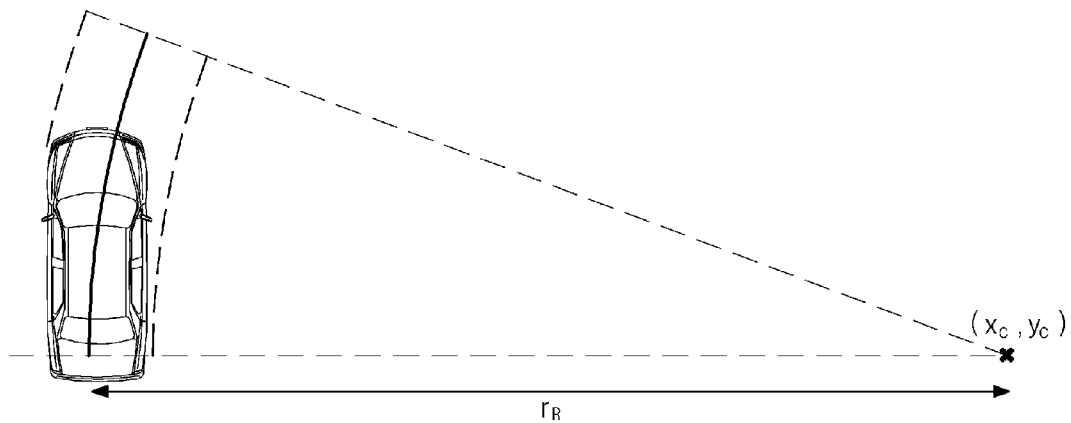
FIGS. 4A-4C is an exemplary view showing a method of dividing and setting a peripheral region of a vehicle into a safety region, a warning region, and a risk region according to an exemplary embodiment of the present invention.

The risk region may be a region in which a collision may be predicted when the obstacle is present in the corresponding region as shown in FIG. 4A. A region between two circular arcs formed by a trace generated by an inner rear wheel of a rotational direction to the steering angle of the wheel based on kinematics and a trace generated by an outer front corner of the rotational direction may be set to the risk region. In particular, a length of the generated arc may be a constant value given as an appropriate value through an experiment.

Figure 4B:
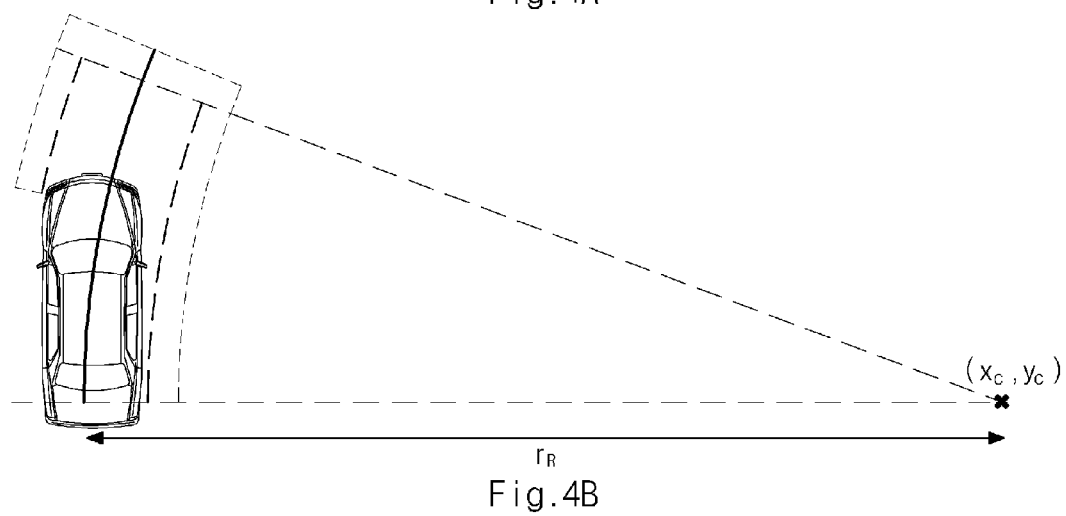
Figure 4C:
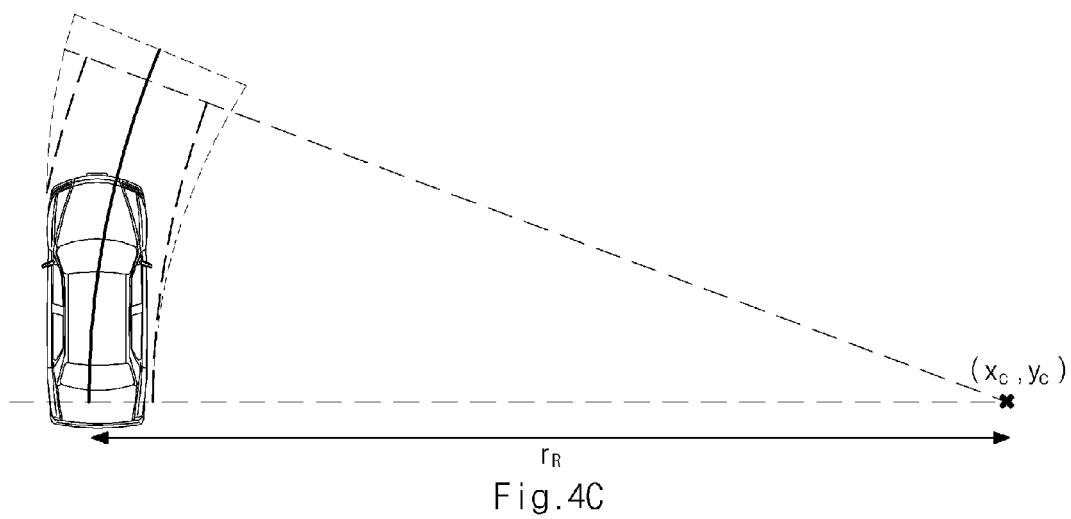

The warning region may be set as a region surrounding the risk region while being spaced apart from the risk region by a predetermined distance as shown in FIGS. 4B and 4C. The warning region may be set to surround the risk region to provide a warning to the driver before informing the driver of the risk due to the predicted collision. In addition, since the obstacle in the front should be considered in advance, a length of an arc may be set to be greater than that of the risk region. The warning region may be set to a form which is gradually widened toward a side as a distance from the vehicle increases, or a form having an outer portion having a larger radius and an inner portion having a smaller radius than a side boundary circular arc of the warning region and the risk region. Further, the safety region may be set to the remaining region except for the risk region and the warning region. The risk region and the warning region may be divided into the left and right regions to classify the left and right risk of the vehicle and provide the risk to the driver.

Figure 5A:
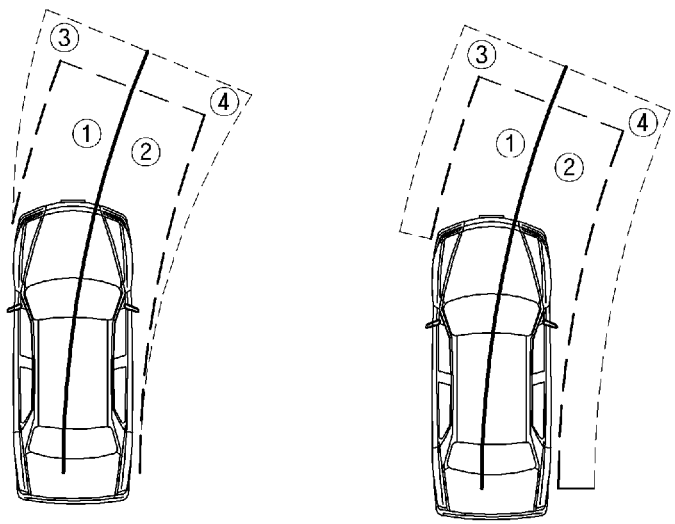
FIG. 5A is an exemplary view showing a figure dividing the risk region and the warning region into left and right regions according to an exemplary embodiment of the present invention.
Figure 5B:
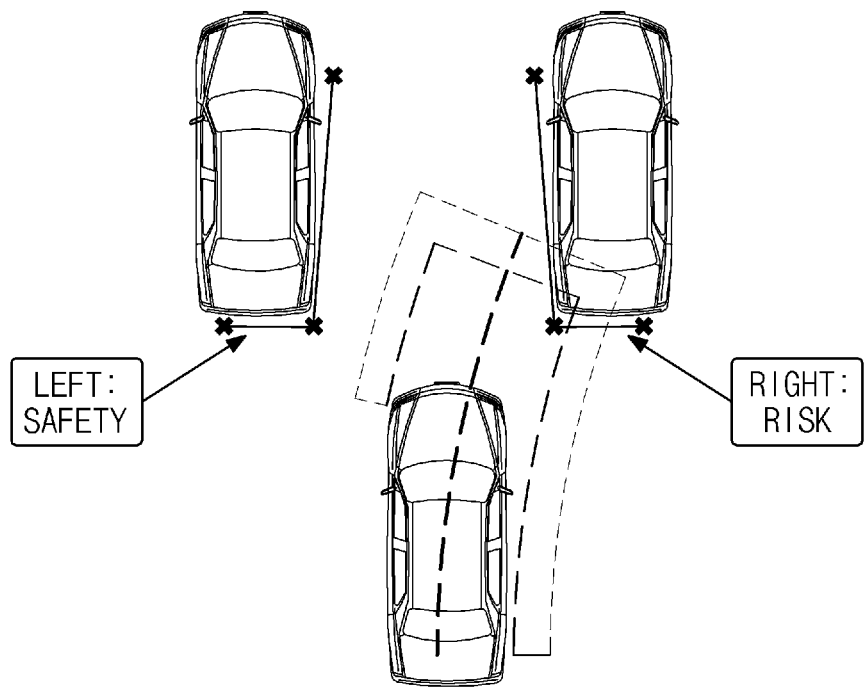
FIG. 5B is an exemplary view showing a relationship between a set region and the obstacle according to an exemplary embodiment of the present invention.

FIG. 5A is an exemplary view showing a figure dividing the risk region and the warning region into left and right regions and FIG. 5B is an exemplary view showing a relationship between a set region and the obstacle. When the vehicle is driven on a complex section such as the narrow road, it may be difficult to recognize whether the vehicle may collide with the obstacles at the left and right sides of the vehicle. Therefore, when whether the collision risk is present on the left or right side may be determined by dividing the region into the left and right and the collision risk may be provided to the driver to allow the driver to pass through the narrow road more easily.

Therefore, the risk determinator 500, executed by the processor, may be configured to divide the risk region and the warning region into the left and right regions based on the center of the rear wheel shaft of the vehicle as shown in FIG. 5A. In FIG. 5A, a region ① indicates a left risk region, a region ② indicates a right risk region, a region ③ indicates a left warning region, and a region ④ indicates a right warning region. The risk determinator 500 may be configured to separately determine the collision risk for the left of the vehicle and the collision risk for the right of the vehicle as shown in FIG. 5B using the regions divided into the left and right as shown in FIG. 5A and separately provide the collision risks to the driver. As shown in FIG. 5B, the points and lines for the obstacle (e.g., another vehicle) in right front of the driving vehicle are positioned in the region ② and the region ④ among the divided regions of FIG. 5A and the points and lines for the obstacle (e.g., another vehicle) in left front of the driving vehicle are positioned in the outside of (e.g., beyond) the region ③. Therefore, the risk determinator 500 may be configured to determine the steering state of FIG. 5B as s left safety and a right risk and provide the determined steering state to the driver.

Figure 6:
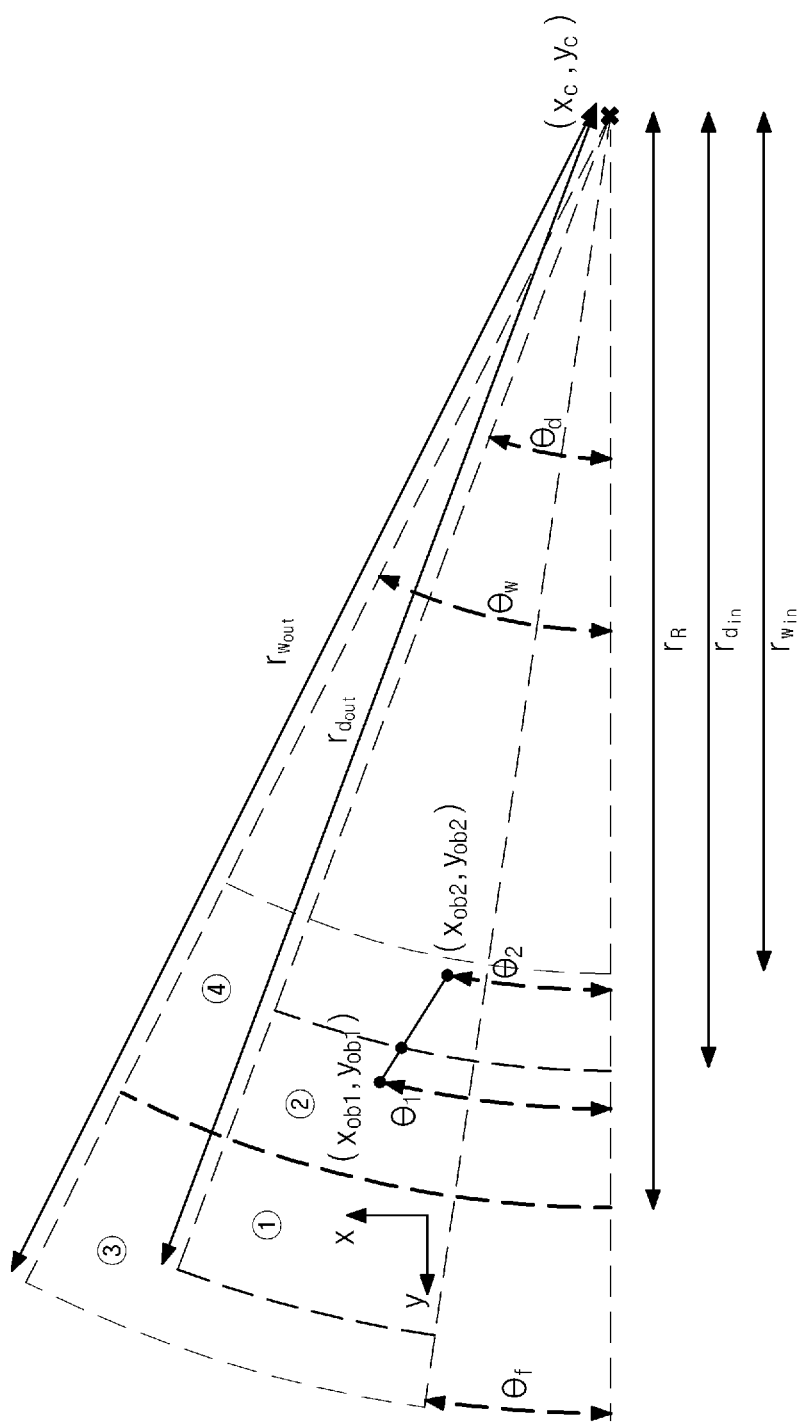
FIG. 6 is an exemplary view showing a method of calculating a relationship between the obstacle and the divided regions as shown in FIG. 5A according to an exemplary embodiment of the present invention.

FIG. 6 is an exemplary view showing a method of calculating a relationship between the obstacle and the divided regions as shown in FIG. 5A according to an exemplary embodiment of the present invention. The relationship between the divided regions and the obstacle may be calculated using a geometric relationship between an equation of the points and lines and an equation of the circular arc. When the steering is manipulated to the right, the driving region may be predicted to be a form having the middle point $(x_c, y_c)$ on the right.

Furthermore, when the driving region is predicted, the left risk region ① may be set to a region having a radius which is greater than $r_R$ and less than $r_{dout}$ and an angle which is greater than $\theta_f$ and less than $\theta_d$ based on the middle point $(x_c, y_c)$. In the same method as those described above, the right risk region ② may be set to a region having a radius which is less than $r_R$ and greater than $r_{din}$ and an angle which is greater than 0 and less than $\theta_d$ based on the middle point $(x_c, y_c)$. In addition, the left warning region may be set to a region except for the left risk region among regions having a radius which is greater than $r_R$ and less than $r_{wout}$ and an angle which is greater than $\theta_f$ and less than $\theta_w$ based on the middle point $(x_c, y_c)$. The right warning region may be set to a region except for the right risk region among regions having a radius which is less than $r_R$ and greater than $r_{win}$ and an angle which is greater than 0 and less than $\theta_w$ based on the middle point $(x_c, y_c)$.

As shown in FIG. 6, when the obstacle is indicated by a first point $(x_{ob1}, y_{ob1})$ and a second point $(x_{ob2}, y_{ob2})$, assuming that angles formed by the respective points and the rear wheel shaft based on the middle point $(x_c, y_c)$ are $\theta_1$ and $\theta_2$, respectively, and distances (radiuses) spaced apart from the middle point $(x_c, y_c)$ may be $r_{ob1} = \sqrt{(x_{ob1}-x_c)^2+(y_{ob1}-y_c)^2}$ and $r_{ob2}=\sqrt{(x_{ob2}-x_c)^2+(y_{ob2}-y_c)^2}$, respectively, angle conditions $\theta_1$ and $\theta_2$ satisfy $0 \leq \theta_1 \leq \theta_w$ and $0 \leq \theta_1 \leq \theta_w$, and distance conditions $r_{ob1}$ and $r_{ob2}$ satisfy $r_{w_m} \leq r_{ob1} \leq r_R$, and $r_{w_m} \leq r_{ob2} \leq r_{R''}$. Therefore, two points $(x_{ob1}, y_{ob1})$ and $(x_{ob2}, y_{ob2})$ may be in the warning region. However, for the point $(x_{ob1}, y_{ob1})$, since $r_{w_m} \leq r_1 \leq r_{R'}$ is satisfied and $0 \leq \theta_1 \leq \theta_d$ is satisfied, the point $(x_{ob1}, y_{ob1})$ may be in the right risk region. In other words, one of the two points $(x_{ob1}, y_{ob1})$ and $(x_{ob2}, y_{ob2})$ may be in the risk region. Therefore, the obstacle may correspond to a right risk situation.

Figure 7:
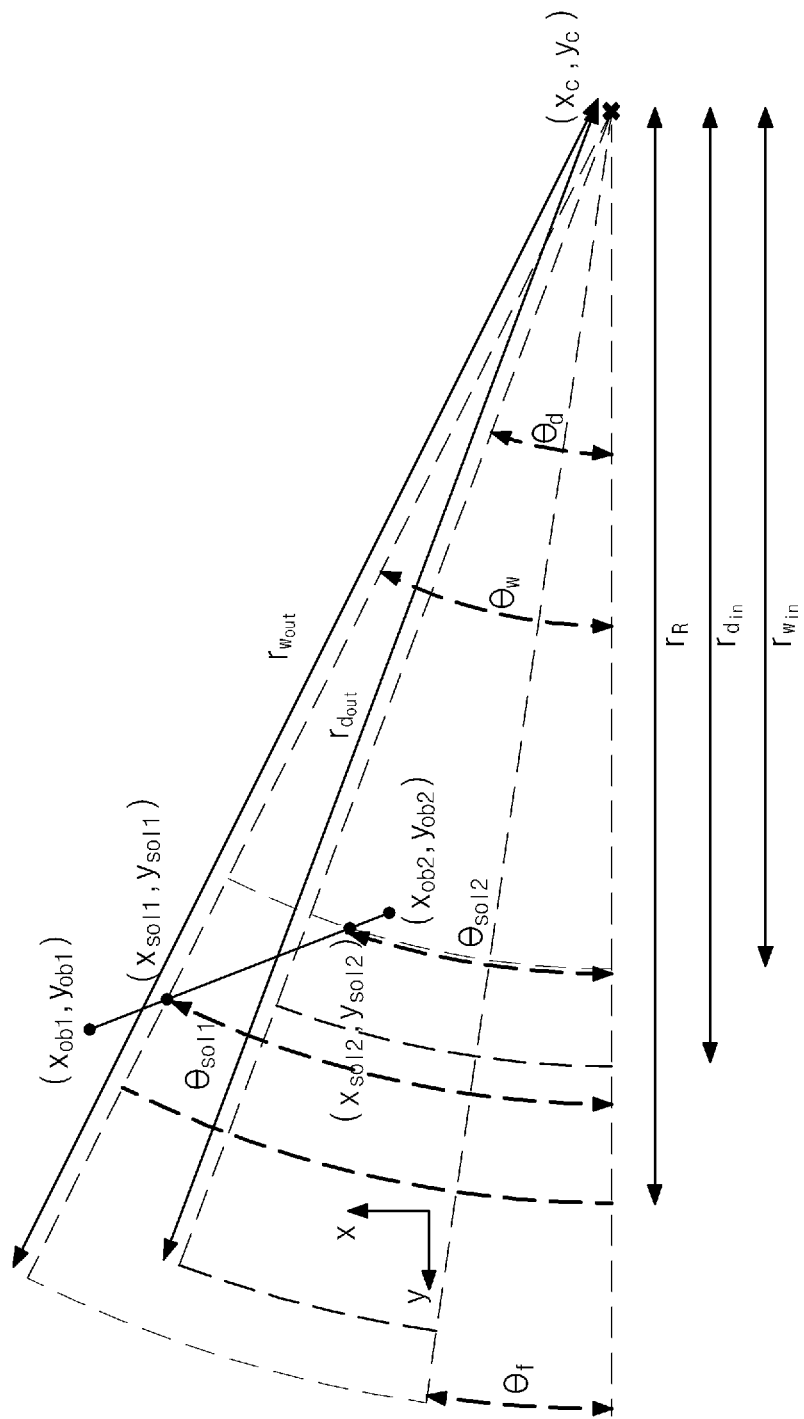
FIG. 7 is an exemplary view showing a method of calculating a relationship the obstacle and the divided regions as shown in FIG. 5A according to another exemplary embodiment of the present invention.

FIG. 7 is an exemplary view showing a method of calculating a relationship the obstacle and the divided regions as shown in FIG. 5A according to another exemplary embodiment of the present invention. FIG. 7 shows points $(x_{ob1}, y_{ob1})$ and $(x_{ob2}, y_{ob2})$ configuring the obstacle are not included in both the risk region and the warning region, but a line connecting the two points is included in the warning region. For the above-mentioned case, the situation may be determined using line information indicating the obstacle. Accordingly, the risk determinator 500 may be configured to calculate points of contact that the lines configuring the obstacle contact the lines and arcs configuring each region (e.g., the warning region and the risk region). In a case of FIG. 7, a point $(x_{sol1}, y_{sol2})$ that contacts a right front boundary line of the warning region and a point $(x_{sol2}, y_{sol2})$ that contacts an inner boundary arc of a right warning region may be calculated.

Assuming that angles formed by the point $(x_{sol1}, y_{sol1})$ and the point $(x_{sol2}, y_{sol2})$ based on the middle point $(x_c, y_c)$ are $\theta_{sol1}$ and $\theta_{sol2}$, respectively, and distances spaced apart from the middle point $(x_c, y_c)$ are $r_{sol1}$ and $r_{sol2}$, respectively, angle conditions $\theta_{sol1}$ and $\theta_{sol2}$ satisfy $0 \leq \theta_{sol1} \leq \theta_w$ and $0 \leq \theta_{sol1} \leq \theta_w$, and distance conditions $r_{sol1}$ and $r_{sol2}$ satisfy $r_{w_m} \leq r_{sol1} \leq r_R$; and $r_{w_m} \leq r_{sol2} \leq r_{R''}$. Therefore, two points $(x_{sol1}, y_{sol1})$ and $(x_{sol2}, y_{sol2})$ may be in the warning region. In particular, both the two points $(x_{sol1}, y_{sol1})$ and $(x_{sol2}, y_{sol2})$ do not satisfy a condition for the risk region. Therefore, the obstacle may be determined to correspond to a right warning situation.

Figure 8:
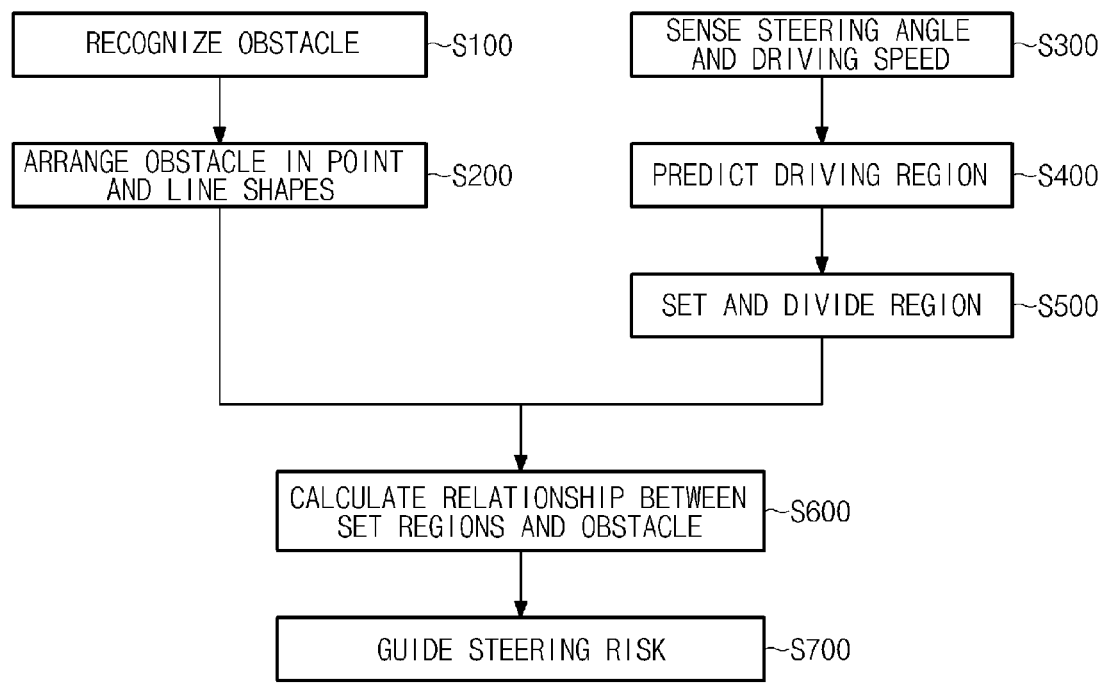
FIG. 8 is an exemplary flow chart describing a steering risk decision method according to an exemplary embodiment of the present invention.

FIG. 8 is an exemplary flow chart describing a steering risk decision method according to an exemplary embodiment of the present invention. When the vehicle is being driven, the obstacle sensor 100 may be configured to sense whether the obstacles are present in the front and side of the vehicle using the Lidar sensor 110 and the ultrasonic sensor 120 and transmit the result to the feature point extractor 300 (S100). When the feature point extractor 300 receives sensor data from the obstacle sensor 100, sensor data may be clustered to find feature points from the classified cluster to indicate the obstacle in the point and line shapes on the two-dimensional plane as shown in FIG. 2 (S200). Arrangement information for the obstacle indicated in the point and line shapes as mentioned above may be transmitted to the risk determinator 500.

While the obstacle is indicated by the points and lines as in S100 and S200, the driving state sensor 200 may be configured to sense the steering angle and the driving speed of the vehicle by the steering angle sensor 210 and the vehicle speed sensor 220, and transmit the result to the driving region predictor 400 (S300). When the driving region predictor 400 receives information for the steering angle and the driving speed from the driving state sensor 200, the driving region of the vehicle may be predicted using received information (S400). In particular, the driving region predictor 400, executed by the processor, may be configured to predict the driving region using the kinematics model of the vehicle. For example, when front wheels of the vehicle in which a length between a front wheel and a rear wheel is $l_w$ are manipulated by an angle of δ, that is, the steering angle is δ, and, the processor may be configured to predict that the corresponding vehicle is driven along a circular arc in which a radius of a rear wheel shaft is $r_R = l_w/\tan(δ)$ according to the kinematics model of the vehicle. Information for the driving region predicted as described above may be transmitted to the risk determinator 500.

The risk determinator 500 may be configured to classify and set the peripheral region of the vehicle into the risk region, the warning region, and the safety region based on the driving region and may be configured to divide the respective regions into the left region and the right region (S500). In other words, assuming that the vehicle is being driven (e.g., turned) along the driving region predicted by the driving region predictor 400, the risk determinator 500 may be configured to set a region between two circular arcs formed by a trace generated by an inner rear wheel of a rotational direction and a trace generated by an outer front corner of the rotational direction to the risk region, as shown in FIG. 4A. In addition, the risk determinator 500 may be configured to set a region surrounding the risk region while being spaced apart from the risk region by a predetermined distance to the warning region. In particular, the warning region may be set to a region substantially uniformly spaced apart from the boundary lines of the risk region by a predetermined distance as shown in FIG. 4B. Alternatively, the warning region may be set in a form which may be gradually widened toward a side as a distance from the vehicle increases as shown in FIG. 4C. Accordingly, the warning region may be set in a form in which an outer side (e.g., having a greater radius) thereof may have a greater radius than a side boundary arc of the risk region and an inner side (e.g., having a smaller radius) thereof has a smaller radius than the side boundary circular arc of the risk region.

Figure 9:
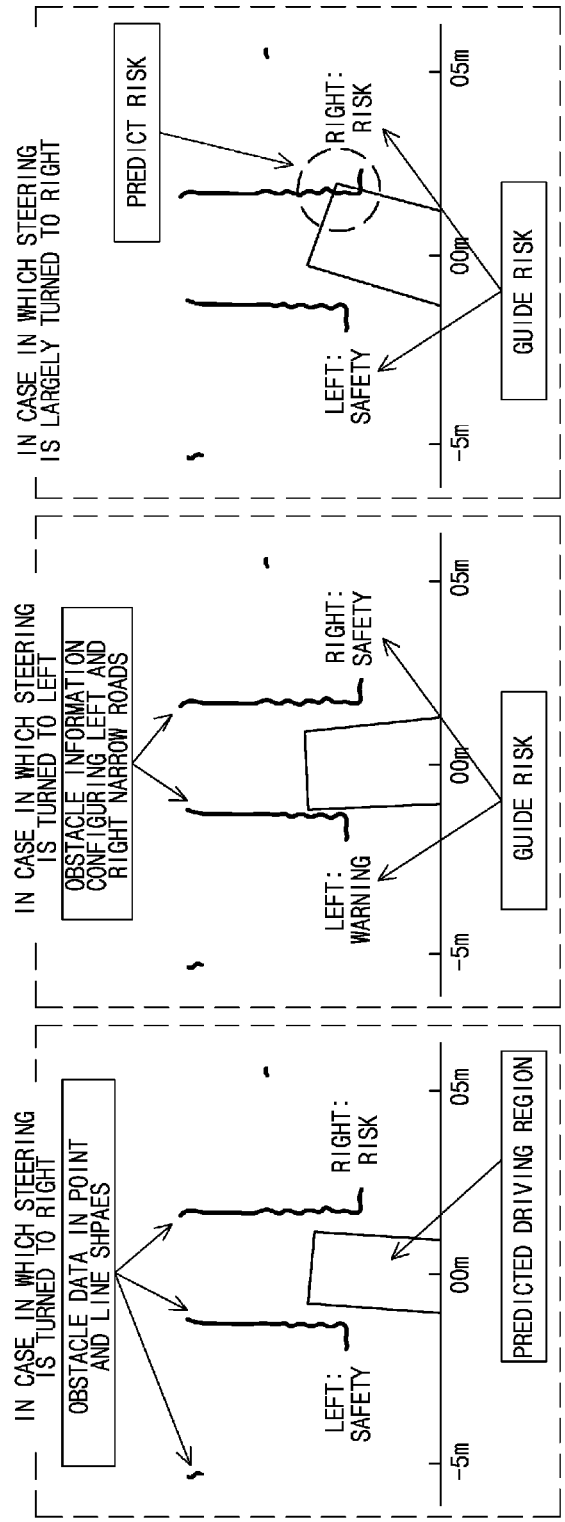
FIG. 9 is an exemplary view of providing a steering risk to a driver according to an exemplary embodiment of the present invention.

The risk determinator 500 may be configured to set a region which is not the risk region and the warning region, that is, an outer region of the warning region as the safety region. When the region setting is completed, the risk determinator 500 may be configured to divide the risk region and the warning region into the left and right regions based on the center of the rear wheel shaft of the vehicle. Further, the risk determinator 500 may be configured to calculate a relationship between arrangement information for the obstacle in S200 and the set region in S500 to determine whether the obstacle is within the warning region or the risk region of the left or the right of the vehicle (S600). For example, as in FIGS. 6 and 7, the risk determinator 500 may be configured to calculate a relationship between the obstacle and the driving region. The risk determinator 500 may also be configured to classify the left and right regions of the vehicle as shown in FIG. 9 based on the calculated result from S600 to provide a steering risk for the respective regions to the driver. As a method of providing the steering risk to the driver, the steering risk may be provided by displaying an image on a display as shown in FIG. 9 or by a voice output.

According to the exemplary embodiment of the present invention, the driver may more simply and accurately predict whether the vehicle may collide with the peripheral obstacles, to allow the driver to more safely drive on a narrow road without colliding with the peripheral obstacles.

The exemplary embodiments of the present invention described above have been provided for illustrative purposes. Therefore, those skilled in the art will appreciate that various modifications, alterations, substitutions, and additions are possible without departing from the scope and spirit of the invention as disclosed in the accompanying claims and such modifications, alterations, substitutions, and additions fall within the scope of the present invention.

What is claimed is:

1. A steering risk decision system, comprising:
   an obstacle sensor configured to sense an obstacle to generate first sensor data;
   a driving state sensor configured to sense a driving state of a vehicle to generate second sensor data; and
   a processor configured to:
      extract feature points from the first sensor data to indicate the obstacle in point and line shapes;
      predict a driving region of the vehicle using the second sensor data;
      calculate a relationship between the vehicle and the obstacle using information for the obstacle indicated in the point and line shapes and information for the driving region;
      determine a steering risk of the vehicle based on the calculated results;
   wherein the processor is configured to set a region between two circular arcs formed by a trace generated by an inner wheel of a rotational direction of the vehicle and a trace generated by an outer wheel front corner of the rotational direction to the risk region;
   wherein the processor is configured to: classify front and side regions of the vehicle into a risk region, a warning region, and a safety region using information for the driving region; and
   compare the classified regions and information for the obstacle to determine a steering risk; and wherein the processor is configured to: divide the risk region and the warning region into a left region and a right region based on the center of a rear wheel shaft of the vehicle; and compare the divided regions and information for the obstacle to determine the steering risk for each of the left and right regions of the vehicle.

2. The steering risk decision system according to claim 1, wherein the processor is further configured to:

cluster the first sensor data and find feature points from the clustered first sensor data to cluster the feature points in the point and line shapes; and arrange the clustered feature points on a two-dimensional plane.

3. The steering risk decision system according to claim 1, wherein the processor is configured to predict the driving region using a kinematics model of the vehicle.

4. The steering risk decision system according to claim 1, wherein the processor is configured to set a region surrounding the risk region while being spaced apart from a boundary line of the risk region by a predetermined distance to the warning region.

5. The steering risk decision system according to claim 1, wherein the processor is configured to set a region surrounding the risk region in a form in which the region is gradually widened toward a side as a distance from the vehicle increases to the warning region.

6. The steering risk decision system according to claim 5, wherein the processor is configured to set a region surrounding the risk region in a form in which an outer side thereof has a larger radius than a side boundary circular arc of the risk region and an inner side thereof has a smaller radius than the side boundary circular arc of the risk region to the warning region.

7. A steering risk decision method of a vehicle, the method comprising:

extracting, by a processor, feature points of an obstacle to indicate the obstacle in point and line shapes;

sensing, by a sensor, a driving state of the vehicle to predict a driving region of the vehicle;

calculating, by the processor, a relationship between the vehicle and the obstacle using information for the obstacle indicated in the point and line shapes and information for the driving region and determining a steering risk of the vehicle based on the calculated result;

setting, by the processor, the risk region between two circular arcs formed by a trace generated by an inner wheel of a rotational direction of the vehicle and a trace generated by an outer wheel front corner of the rotational direction;

wherein in the calculating of the relationship between the vehicle and the obstacle, front and side regions of the vehicle are classified, by the processor, into a risk region, a warning region, and a safety region to determine whether the obstacle is positioned in any region of the classified regions; and wherein in the calculating of the relationship between the vehicle and the obstacle, the risk region and the warning region are divided, by the processor, into a left region and a right region based on the center of a rear wheel shaft of the vehicle to determine whether the obstacle is positioned in any region of the left region and the right region.

8. The steering risk decision method according to claim 7, further comprising:

setting, by the processor, the warning region to a region surrounding the risk region while being spaced apart from a boundary line of the risk region by a predetermined distance.

9. The steering risk decision method according to claim 7, further comprising:

setting, by the processor, the warning region to a region surrounding the risk region in a form in which the region is gradually widened toward a side as a distance from the vehicle increases.

10. The steering risk decision method according to claim 7, further comprising:

setting, by the processor, the warning region to a region surrounding the risk region in a form in which an outer side thereof has a larger radius than a side boundary circular arc of the risk region and an inner side thereof has a smaller radius than the side boundary circular arc of the risk region.

11. A non-transitory computer readable medium containing program instructions executed by a processor, the computer readable medium comprising:

program instructions that extract feature points of an obstacle to indicate the obstacle in point and line shapes;

program instructions that control a sensor to sense a driving state of the vehicle to predict a driving region of the vehicle;

program instructions that calculate a relationship between the vehicle and the obstacle using information for the obstacle indicated in the point and line shapes and information for the driving region and determining a steering risk of the vehicle based on the calculated result;

program instructions that set the risk region between two circular arcs formed by a trace generated by an inner wheel of a rotational direction of the vehicle and a trace generated by an outer wheel front corner of the rotational direction;

program instructions that classify front and side regions of the vehicle into a risk region, a warning region, and a safety region to determine whether the obstacle is positioned in any region of the classified regions; and program instructions that divide the risk region and the warning region into a left region and a right region based on the center of a rear wheel shaft of the vehicle to determine whether the obstacle is positioned in any region of the left region and the right region.

* * * * *